July 22, 1924.

G. E. McCRACKEN

PUMP

Filed Jan. 19, 1924

INVENTOR
George E. McCracken
John A. Rainsmith
BY ATTORNEY

Patented July 22, 1924.

1,502,390

UNITED STATES PATENT OFFICE.

GEORGE E. McCRACKEN, OF SAN JOSE, CALIFORNIA.

PUMP.

Application filed January 19, 1924. Serial No. 687,242.

*To all whom it may concern:*

Be it known that I, GEORGE E. McCRACKEN, a citizen of the United States, and a resident of San Jose, in the county of Santa Clara and State of California, have invented certain new and useful Improvements in Pumps, of which the following is a specification.

In pumping oil from deep wells it is customary to use a plunger pump provided with a ball valve, the said pump being reciprocated in a tubular discharge column. In the type of pump now commonly used sand is permitted to gather in pockets in the outside surface of the plunger, thereby scoring the opposing surfaces of the discharge pipe and plunger, materially reducing their effective lives and adding materially to the cost of equipment by their necessary constant renewal.

It is the object of my invention to provide a plunger pump for the purpose specified that is so constructed as to effectually prevent the gathering of an erosive material between the plunger and the pump discharge casing.

It is another object of my invention to provide a device of the character indicated that will be simple in form and construction, economical to manufacture, durable, and highly efficient in its practical application.

In the drawing:—

Figure 1:
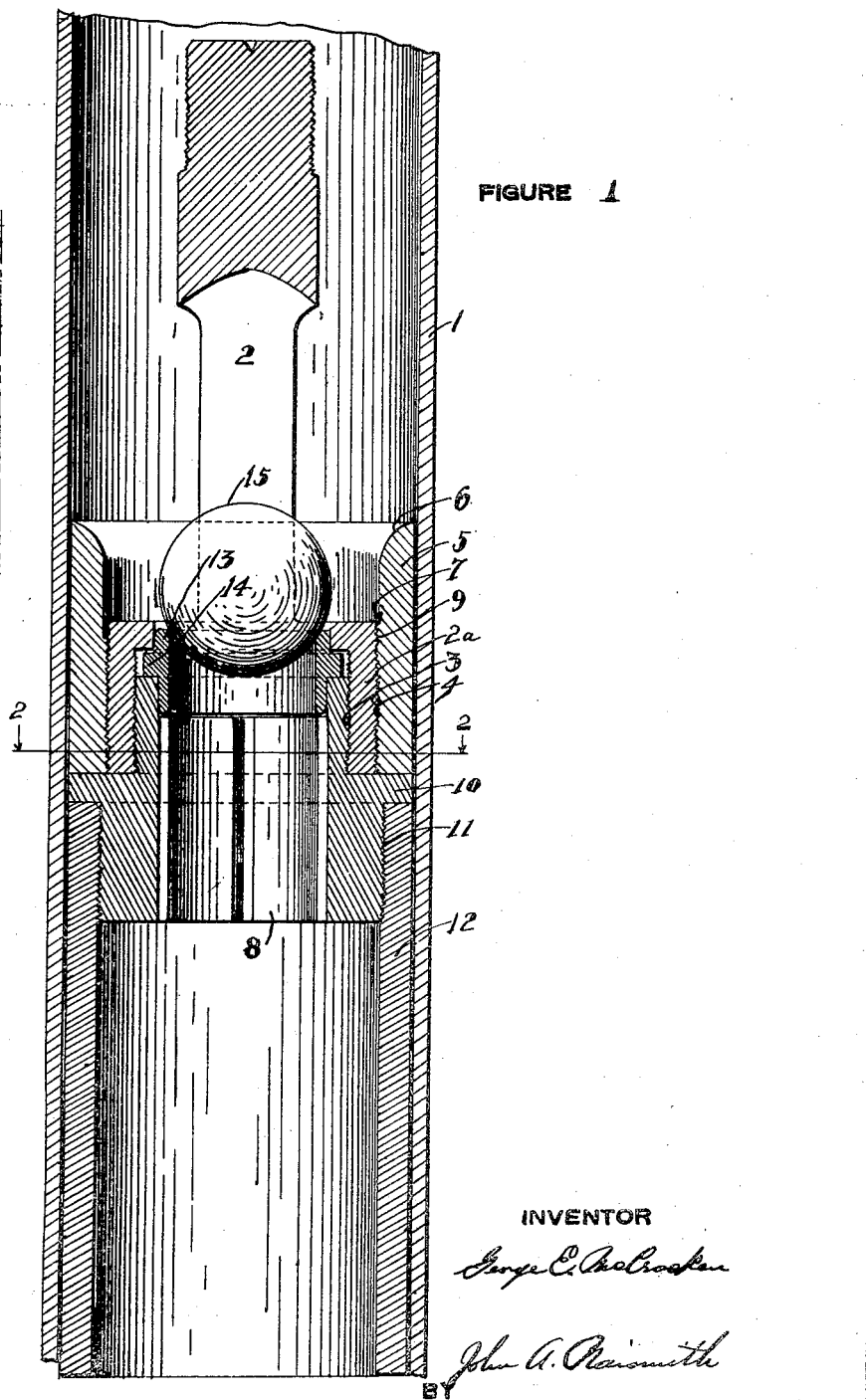
Figure 1 is a vertical transverse section through a structure embodying my invention.
Figure 2:
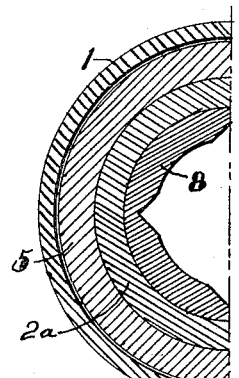
Figure 2 is a half section on line 2—2 of Figure 1.

Referring now more particularly to the drawing I show at 1 the discharge casing of the assembled pump structure.

At 2 is shown a cage of the usual type but carrying an annular portion 2ª depending therefrom and threaded interiorly and exteriorly as at 3 and 4 respectively.

At 5 is shown a collar or sleeve having a bevelled upper and inner edge 6 and threaded interiorly as at 7 to engage threaded portion 4 on part 2ª of cage 1, this sleeve having a sliding fit in casing 1.

At 8 I show a nut threaded exteriorly as at 9 to engage threaded portion 3 on part 2ª, and provided with an annular outwardly extending flange 10 having substantially the same outer diameter as sleeve 5.

The lower portion of nut 8 has a thickness substantially equal to the combined thicknesses of its upper portion and part 2ª of cage 1, and is externally threaded as at 11 to engage a threaded sleeve 12.

The upper end of nut 8 is formed to receive a valve seat 13 having an outwardly extending flange 14, the said seat carrying ball valve 15 as shown.

When this structure is assembled the seat 13 is held in position against vertical displacement through the engagement of its flange 14 with part 2ª of cage 1 and nut 8, and the exterior of the structure presents an unbroken surface offering no lodging for sand or other foreign substances in the liquid being pumped, the sleeves 5 and 12 extending both above and below the valve 15.

An exceptionally valuable feature of this construction is its simplicity and the ease with which it may be assembled and disassembled. The assembling is the work of but a moment requiring only threading sleeve 5 into position on cage part 2 against the flange 10 on nut 8 which has previously been threaded into part 2ª as shown, and then threading sleeve 12 into position on nut 8.

By so arranging the parts that both the upper sleeve and the nut are mounted directly on the cage part 2, a great saving of material is effected as well as reducing the size of and simplifying the form of the parts.

It is to be understood, of course, that while I have herein shown and described one specific form of the invention, changes in form, construction and method of operation may be made within the scope of the appended claim.

I claim:—

A structure of the character indicated, comprising a cage having an annular exteriorly and interiorly threaded portion, a nut having a ball valve arranged thereon and carrying an outwardly extending annular flange threaded into said cage portion, a sleeve threaded on to said cage portion and having substantially the same outer diameter as said flange, and a sleeve threaded on to said nut in alignment with said first mentioned sleeve.

GEORGE E. McCRACKEN.